United States Patent
Tsuji et al.

(10) Patent No.: US 6,992,577 B2
(45) Date of Patent: Jan. 31, 2006

(54) COMBINED SENSOR

(75) Inventors: Masatoshi Tsuji, Ohtsu (JP); Michinori Noguchi, Ohtsu (JP); Cholmin Seo, Ohtsu (JP)

(73) Assignee: Optex Co., Ltd., Shiga (JP)

( * ) Notice: Subject to any disclaimer, the term of this patent is extended or adjusted under 35 U.S.C. 154(b) by 195 days.

(21) Appl. No.: 10/738,096

(22) Filed: Dec. 18, 2003

(65) Prior Publication Data

US 2005/0062601 A1     Mar. 24, 2005

(30) Foreign Application Priority Data

Sep. 4, 2003   (JP) ............................. 2003-312412

(51) Int. Cl.
*G08B 19/00*  (2006.01)
(52) U.S. Cl. .................. 340/522; 340/545.3
(58) Field of Classification Search ........ 340/522, 340/545.3, 600; 342/27, 28
See application file for complete search history.

(56) References Cited

U.S. PATENT DOCUMENTS

| | | | | |
|---|---|---|---|---|
| 5,340,980 A | * | 8/1994 | Bianchini et al. | 250/214 R |
| 5,714,928 A | * | 2/1998 | Sudo et al. | 340/436 |
| 6,842,113 B2 | * | 1/2005 | Tsuji | 340/554 |
| 6,894,608 B1 | * | 5/2005 | Gunderson | 340/468 |

* cited by examiner

*Primary Examiner*—Daryl C Pope
(74) *Attorney, Agent, or Firm*—Wenderoth, Lind & Ponack, L.L.P.

(57) ABSTRACT

The combined sensor of the present invention is comprised of an MW sensor and a PIR sensor, in which the frequency difference of two microwaves transmitted by the MW sensor is set such that the phase difference between the IF signals received by the MW sensor is approximately 180° when there is an object at the intermediate distance between the maximum detection distance within the target detection area and the maximum detection distance in the event of a deviation of the detection area attributable to mounting error of the infrared sensor 4.

2 Claims, 6 Drawing Sheets

COMBINED SENSOR

BACKGROUND OF THE INVENTION

1. Technical Field

The present invention relates to a combined sensor provided with a microwave sensor (hereinafter referred to as "MW sensor")—an active sensor using low-frequency electromagnetic wave rather than visible radiation—and with an infrared sensor (e.g., passive infrared sensor; hereinafter referred to as "PIR sensor").

2. Prior Art

Combined sensor has been known for use in an intruder detection system (burglar system) as disclosed, for example, by Japanese Unexamined Patent Application Publication No. 11-39574. This type of combined sensor is provided with an MW sensor designed to send microwave toward the detection area, receive the reflected wave from a human body and detect the intruder through Doppler effect and a PIR sensor designed to receive infrared radiation from a human body in the detection area and detect the intruder from the difference between the human body and the ambient temperature. The combined sensor compliments weaknesses of the two sensors and offers improved reliability against false alarms by overlapping the detection areas of the MW and PIR sensors and ANDing their detection counts. False alarm due to external radio wave for the MW sensor and false alarm caused by sunlight for the PIR sensor are among the weaknesses of the two sensors.

This type of combined sensor has the PIR sensor beam range (range in which infrared radiation from the human body is receivable) set on the ground near the outer edge of the detection area, thus discriminating between detection and non-detection areas. For this reason, even if a large-sized object (truck or train) passes by the combined sensor and if the object is detected by the MW sensor (the MR sensor issues an alarm), the combined sensor can be set not to detect the object (issue an alarm) when the object is outside the detection area set by the PIR sensor (outside the beam range).

Figure 7:
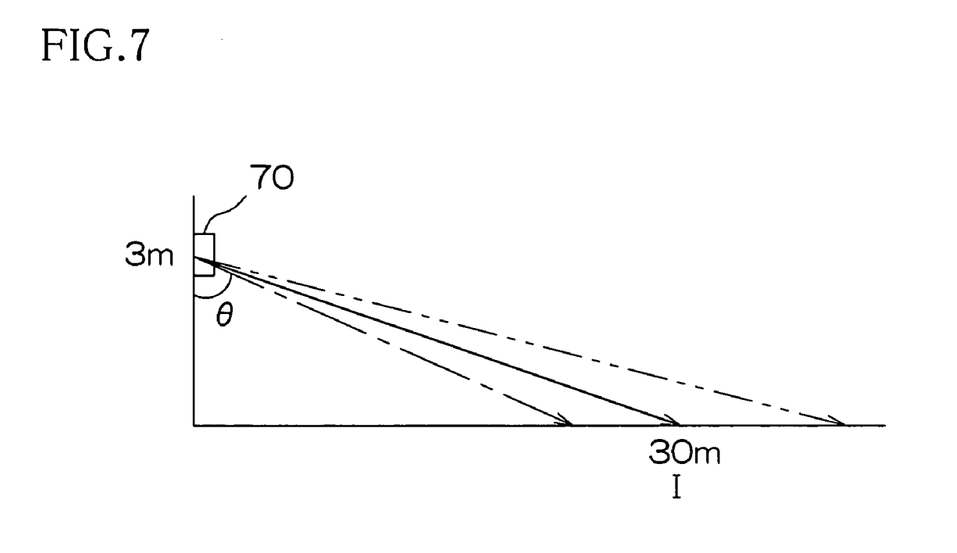
FIG. 7 is an explanatory view of a deviation of detection area as a result of combined sensor mounting error.

Incidentally, since the detection area of the aforementioned combined sensor is determined by the PIR sensor beam range, it may be impossible to set the beam position on the ground near the outer edge of the target detection area in the event of a combined sensor mounting error (mounting angle error). Thus, if the beam position is not set on the ground near the outer edge of the target detection area, the detection area of the combined sensor may deviate considerably from the target detection area. FIG. 7 shows a deviation of the detection area (beam position) as a result of mounting error of a sensor 70 mounted on the wall of a house or other location. Suppose, for example, that one wishes to set the area for object detection (target detection area) to a point at a distance of up to 30 m. As long as the mounting angle of the combined sensor is correct, the beam position is set on the ground at the 30 m point (point I in the figure). In contrast, if the sensor is mounted pointing more downward than it would at the correct mounting angle, the area for object detection is shorter than the 30 m distance point (refer to the alternate long and short dashed line in the figure). Conversely, if the sensor is mounted pointing more upward than it would at the correct mounting angle, the area for object detection is longer than the 30 m distance point (refer to the alternate long and two short dashed line in the figure).

Table 1 shown below depicts an example of relationship between mounting angle error of the combined sensor on the wall surface and distance to the outer edge of the detection area (maximum detection distance) as a result of the error. Assuming that the combined sensor mounting height is 3 m, the target detection area is up to the 30 m point and the appropriate mounting angle of the combined sensor is 84.3°, Table 1 shows the case in which ±3% error (with upward error as positive) may result as the mounting angle error of the combined sensor (maximum error). This mounting angle error may not only occur during mounting of the combined sensor but also as a result of change over time.

TABLE 1

| Angle (deg) | Max. detection distance (m) |
|---|---|
| 81.3 (−3) | 19.6 |
| 82.3 (−2) | 22.2 |
| 83.3 (−1) | 25.5 |
| 84.3 (0) | 30 |
| 85.3 (+1) | 36.5 |
| 86.3 (+2) | 46.3 |
| 87.3 (+3) | 63.6 |

As is apparent from Table 1, −3° error (pointing downward) in the combined sensor mounting angle leads to a difference of only 10 m or so from the target detection area while +3° error (pointing upward) in the combined sensor mounting angle results in a difference of as much as about 33 m from the target detection area. This means that despite the original intention to perform object detection only up to the 30 m distance point, objects existing in the area up to a distance of about 63 m are subject to detection due to the mounting angle error. In other words, the combined sensor issues a false alarm if there is an object in the area at a distance of up to approximately 63 m—an area beyond the 30 m point. This is the reason why further improvement has been needed to enhance sensor reliability.

The present invention was conceived in light of the foregoing. It is therefore the object of the present invention to provide a combined sensor, provided with MW and infrared sensors, capable of detecting objects only within the desired detection area even in the event of an error in the sensor mounting angle.

SUMMARY OF THE INVENTION

As means for solving the problem according to the present invention to achieve the above object, a combined sensor provided with two-frequency MW and infrared sensors is capable of avoiding false alarm even in the event of a deviation of the infrared sensor's detection area due to sensor mounting error or other causes by properly setting a frequency difference between two microwaves sent by the MW sensor.

Specifically, the present invention is based on a combined sensor comprising a microwave sensor that transmits two microwaves having different frequencies, receives, if there is an object in the direction of transmission of the microwaves, reflected waves of respective microwaves from the object and detects the object based on phase difference between IF signals after mixing of the reflected and transmission waves; and an infrared sensor that receives infrared radiation from an object in the detection area and detects the object, wherein an alarm is issued if an object is detected by the two sensors. For this combined sensor, the frequency difference of two microwaves transmitted by the microwave sensor is set such that the phase difference between the IF signals is approximately 180° when there is an object at the intermediate distance between the maximum detection distance within the target detection area or predetermined area for object detection and the maximum detection distance in the event of a deviation of the detection area attributable to mounting error of the infrared sensor.

Figure 8:
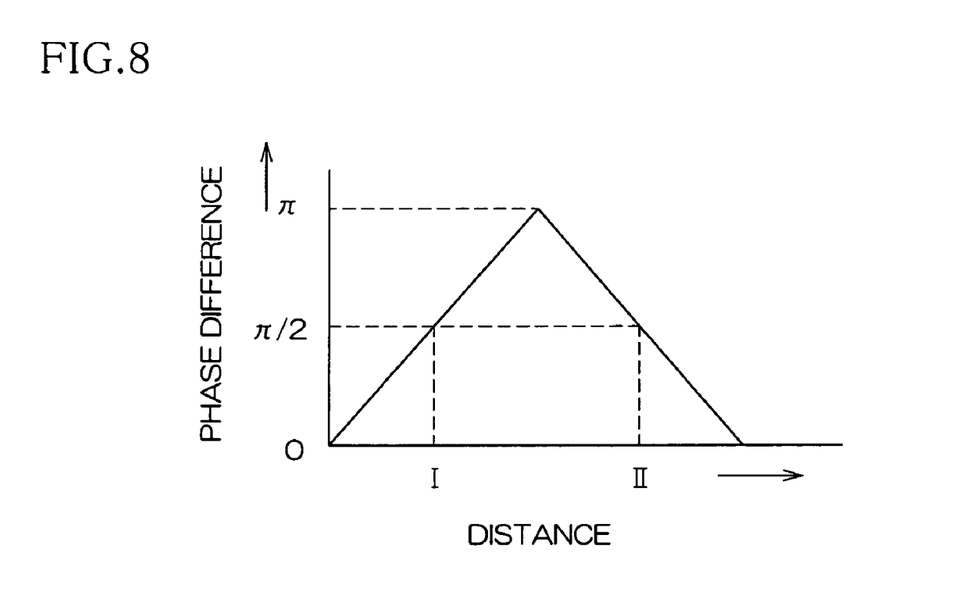
FIG. 8 is an explanatory view of "aliasing error."

Two-frequency MW sensors are generally attended with "aliasing error." The "aliasing error" is an aliasing occurring at the 180° (π) phase difference point in the line showing the relationship between phase difference between IF signals and distance to the object as shown in FIG. 8. If the distance to the object is determined based only on the phase difference between the two IF signals, two points are obtained as the distance to the object found by the detected phase difference between the IF signals. In FIG. 8, for example, if the phase difference between the two IF signals is 90° (π/2), two points I and II in the figure are found as the distance to the object.

In the present means for solving the problem, the frequency difference between two microwaves sent by the microwave sensor is set such that the phase difference between the IF signals is approximately 180° when there is an object at the position of the intermediate distance as described earlier (intermediate distance between the maximum detection distance within the target detection area and the maximum detection distance in the event of a deviation of the detection area attributable to infrared sensor mounting error). For this reason, even if a phase difference between the IF signals—the phase difference derived from detection of an object at a farther distance than the maximum detection distance (maximum detection distance within the detection area set in the event of the maximum infrared sensor mounting error)—is obtained as a reception signal (even if the same phase difference is obtained as when there is an object at a near distance as a reception signal) in the event of a deviation of the detection area attributable to infrared sensor mounting error, that is the region outside the infrared sensor's detection area (detection area caused by mounting error) and therefore the infrared sensor does not detect the object (issue an alarm), thus preventing the combined sensor from detecting the object. The present invention is characteristic in that the frequency difference between two microwaves transmitted by the microwave sensor is set such that the above state arises.

In other words, if the infrared sensor issues an alarm when there is a phase difference between IF signals smaller than that when there is an object at a farther distance than the maximum detection distance in the event of a deviation of the detection area attributable to infrared sensor mounting error, a conclusion can be drawn that the phase difference is derived from the fact that there is an object within the target detection area—predetermined area for object detection (detection area set with no infrared sensor mounting error).

Specific description will be given with reference to FIG. 5. For instance, if the phase difference between IF signals is 90° (π/2), two points (α, β in the figure) are obtained as the distance to the object in consideration of the aforementioned "aliasing error." However, a frequency difference is set between two microwaves in the present means for solving the problem, thus eliminating the need to consider the phase difference between IF signals (phase difference derived from the existence of an object at a location β) when there is an object at a farther distance than the maximum detection distance (distance Rpir2 in the figure) in the event of a deviation of the detection area attributable to infrared sensor mounting error. The reason is that the infrared sensor does not issue an alarm in such a case (the infrared sensor does not detect an object at this position even in the event of the maximum infrared sensor mounting error). This means that it is no longer necessary to consider the phase difference between IF signals caused by the object existing in the shaded conceptual region in FIG. 5. Therefore, if there is such a phase difference and if the infrared sensor detects an object (issues an alarm), a conclusion can be drawn that the distance to the object is α in the figure (that is, object within the original target detection area (within a distance Rpir in the figure)).

Thus, the present embodiment ensures accurate detection of objects only within the desired detection area even in the event of an error in the infrared sensor mounting angle while remaining unaffected by "aliasing error"—the drawback to the microwave sensor.

The following is a preferred configuration in consideration of a certain amount of error (error in frequency difference between microwaves and phase difference between IF signals). That is, the frequency difference of two microwaves transmitted by the microwave sensor is set lower than the value that results in a phase difference of 180° between IF signals when there is an object at the intermediate distance between the maximum detection distance within the target detection area or predetermined area for object detection and the maximum detection distance in the event of a deviation of the detection area attributable to mounting error of the infrared sensor.

Figure 6:
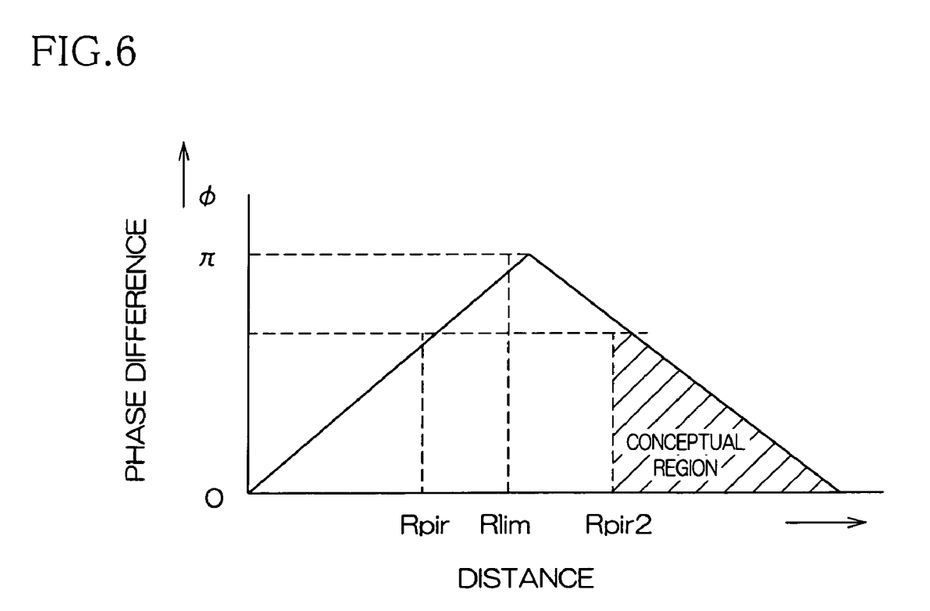
FIG. 6 is a diagram corresponding to FIG. 5 of a variant.

According to the configuration, the aforementioned effect can be reliably obtained even in the event of the error. FIG. 6 shows a line representing the relationship between phase difference between IF signals and distance to the object when the present means for solving the problem is used. As is apparent from the figure, expansion of the conceptual region allows overlapping of phase difference between IF signals derived from an object existing within the original target detection area (area up to the distance Rpir in the figure) and phase difference derived from an object existing within the conceptual region, thus ensuring detection of objects only within the desired detection area.

The combined sensor provided with MW and infrared sensors according to the present invention is capable of avoiding false alarm even in the event of a deviation of the infrared sensor's detection area due to sensor mounting error or other cause by properly setting a frequency difference between two microwaves sent by the MW sensor. Therefore, only objects within the desired detection area can be accurately detected, thus providing enhanced reliability to the sensor.

DESCRIPTION OF THE PREFERRED EMBODIMENTS

Embodiments of the present invention will be described below with reference to the accompanying drawings. In the present embodiment, a description will be given of the case in which a combined sensor is used for a burglar system.

Description of the Overall Configuration of the Burglar System

Figure 1:
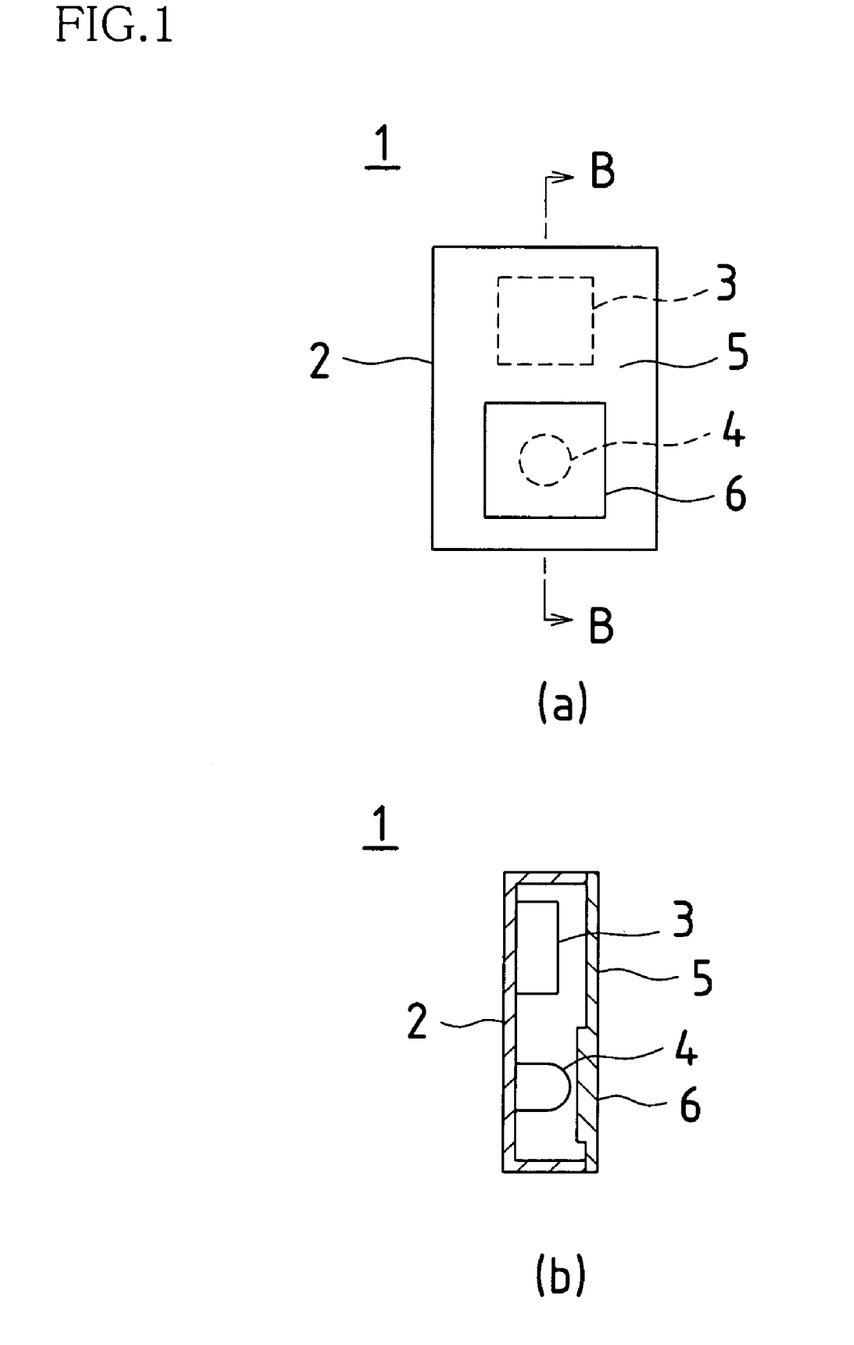
FIG. 1(a) is a front view of a burglar sensor unit according to the present embodiment.
FIG. 1(b) is a sectional view taken along line B—B of FIG. 1(a)

FIG. 1 show a burglar sensor unit 1 used as a combined sensor in a burglar system according to the present embodiment. FIG. 1(a) illustrates a front view of the burglar sensor unit 1 while FIG. 1(b) a sectional view taken along line B—B of FIG. 1(a). The burglar sensor unit 1 accommodates an MW sensor 3 and a PIR sensor 4 in a case 2, with the front of the case 2 covered with a cover 5 that allows passage of microwaves and a Fresnel lens 6 formed on the front of the IR sensor 4.

Figure 2:
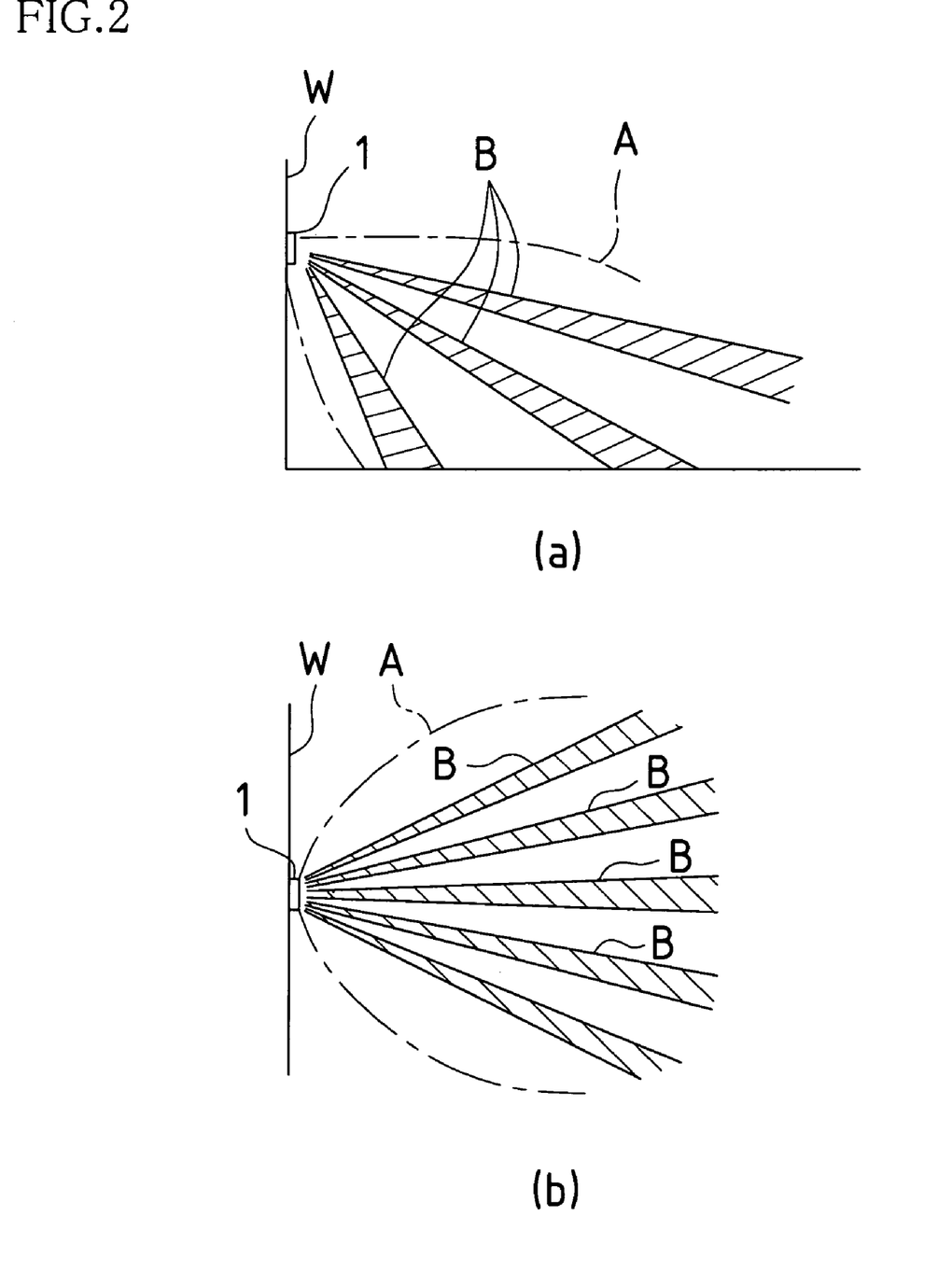
FIG. 2(a) is a side view showing the state in which the burglar sensor unit according to the present embodiment is installed.
FIG. 2(b) is a plan view of the burglar sensor unit.

FIG. 2 show the relationship between unit installation position and detection areas of the MR sensor 3 and the PIR sensor 4 when the burglar sensor unit 1 is installed (installed, for example, on the outside wall of a house). FIG. 2(a) illustrates a side view while FIG. 2(b) a plan view. In FIG. 2, the burglar sensor unit 1 is installed on an upper portion of a wall surface W that forms the outside wall of a house. A detection area A indicated by alternate long and short dashed line in the figures represents a microwave irradiation area of the MW sensor 3. On the other hand, shaded detection areas B in the figures represent detection areas of the PIR sensor 4. The detection areas B are set so as to cover the surroundings of the house with a plurality of beams using the Fresnel lens 6. When the burglar sensor unit 1 is installed on the wall surface W correctly (without any error in mounting angle), the detection area A of the MW sensor 3 and the detection areas B of the PIR sensor 4 are overlapped with each other.

Figure 3:
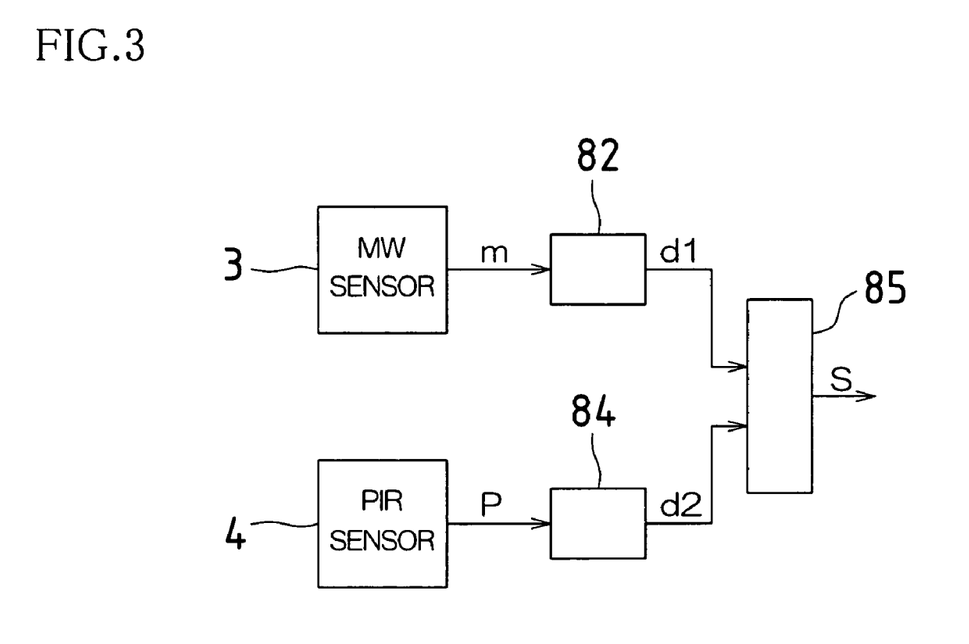
FIG. 3 is a block diagram showing a system configuration of a burglar system according to the present embodiment.

FIG. 3 illustrates a block diagram showing a system configuration of a burglar system provided with the burglar sensor unit 1. As shown in FIG. 3, a human body detection signal m detected by the MW sensor 3 is input to a first detection circuit 82 in the present burglar system. On the other hand, a human body detection signal p detected by the PIR sensor 4 is input to a second detection circuit 84.

When each of the human body detection signals m and p exceeds its given threshold value, detection signals d1 and d2 are individually output to a judgment circuit 85 by the detection circuits 82 and 84. This means that the first detection circuit 82 is used to detect presence/absence of an intruder from the human body detection signal m. The first detection circuit 82 outputs the detection signal d1 to the judgment circuit 85 when the level of the human body detection signal m exceeds its threshold value. On the other hand, the second detection circuit 84 is used to detect presence/absence of an intruder from the human body detection signal p. The second detection circuit 84 outputs the detection signal d2 to the judgment circuit 85 when the level of the human body detection signal p exceeds its threshold value.

The judgment circuit 85 performs calculation on each of the detection signals d1 and d2 that are input within a predetermined time period and outputs an alarm signal S by judging that there is an intruder if the calculation result falls within a given value determined based on measurement data. This allows the security firm to be alerted via a centralized control apparatus of the present system.

Detailed Description of the MW Sensor 3

Figure 4:
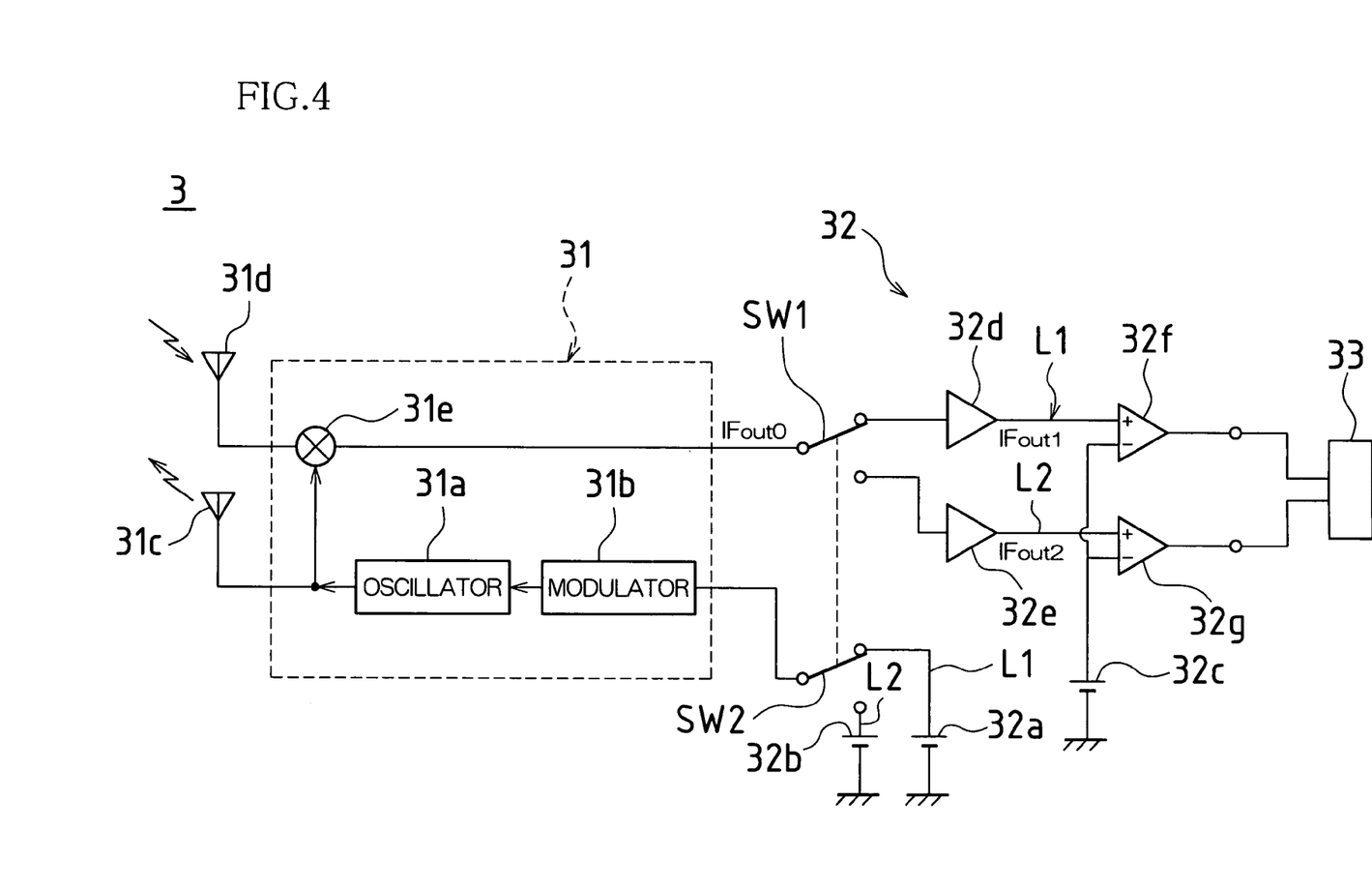
FIG. 4 illustrates a circuit configuration of an MW sensor according to the present embodiment.

Next, the MW sensor 3, the feature of the present embodiment, will be described in detail. FIG. 4 illustrates a circuit configuration of the MW sensor 3 according to the present embodiment. As shown in the figure, the MW sensor 3 is provided with an RF module 31 and a signal processing unit 32.

The RF module 31 is provided with an oscillator 31a for generating microwaves, a modulator 31b for changing the frequencies of the microwaves generated from the oscillator 31a, a transmit antenna 31c for transmitting the microwaves generated from the oscillator 31a toward the detection area, a receive antenna 31d for receiving the reflected waves of the microwaves reflected by an object such as human body and a mixer 31e for mixing the received microwaves and the voltage waveform of the oscillator 31a and outputting the resultant signals. That is, if there is a human body, etc. in the detection area, the microwaves transmitted from the transmit antenna 31c toward the detection area are reflected, and the reflected waves from the human body, etc. undergo frequency modulation due to Doppler effect and are received by the receive antenna 31d. The received reflected waves are mixed with the voltage waveform of the oscillator 31a first and then output from the RF module 31 as IF output signals (IFout 0) to the signal processing unit 32.

On the other hand, the signal processing unit 32 is provided with first and second output lines L1 and L2, one for each of microwaves of individual frequencies transmitted from the transmit antenna 31c. The lines L1 and L2 have power supplies 32a, 32b and 32c, IF amplifiers 32d and 32e and comparators 32f and 32g, with an object distance judgment unit 33 provided on the output side of the comparators 32f and 32g.

Each of the IF amplifiers 32d and 32e is connected to the output side of the RF module 31 via a first switch SW1. The first switch SW1 is designed to toggle between the first output line L1 when one of the two microwaves is transmitted from the transmit antenna 31c and the second output line L2 when the other microwave is transmitted from the transmit antenna 31c. This means that an IF output signal (IFout 1), associated with the reflected wave reflected by the human body, etc. when one of the microwaves is transmitted, is output to the first output line L1 while an IF output signal (IFout 2), associated with the reflected wave reflected by the human body, etc. when the other microwave is transmitted, is output to the second output line L2.

The power supplies 32a and 32b are connected to the input side of the RF module 31 via a second switch SW2 that is gang-controlled with the first switch SW1. The second switch SW2 is also designed to toggle between the power supplies 32a and 32b depending on which of the two microwaves is transmitted from the transmit antenna 31c. This means that, depending on whether the second switch SW2 is connected to the power supply 32a or 32b, the modulator 31b switches the microwave frequency, thus allowing the frequency of the microwave transmitted from the transmit antenna 32c to be changed.

Thus, as a result of toggling of the switches SW1 and SW2, a switching is performed at given time intervals between a first processing operation—transmission of the microwave of one frequency toward the detection area from the transmit antenna 31c, outputting of the IF output signal (IFout 1) based on the reflected wave of the microwave to the first output line L1 of the signal processing unit 32 and signal processing at the first output line L1—and a second processing operation—transmission of the microwave of the other frequency toward the detection area from the transmit antenna 31c, outputting of the IF output signal (IFout 2) based on the reflected wave of the microwave to the second output line L2 of the signal processing unit 32 and signal processing at the second output line L2. In each processing operation, the IF output signals output by the RF module 31 are amplified by the IF amplifiers 32d and 32e. The outputs of the IF amplifiers 32d and 32e are shaped by the comparators 32f and 32g into a rectangular wave first and then output to the object distance judgment unit 33.

Further, a detailed description of each of the processing operations is given. When there is no human body, etc. in the detection area, the frequency of the microwave transmitted from the transmit antenna 31c is the same as that of the microwave received by the receive antenna 31d, thus resulting in "0" IF frequency in the output signals from the IF amplifiers 32d and 32e. As a result, no signals are output from the comparators 32f and 32g. In contrast, if there is a human body, etc. in the detection area, the microwave transmitted from the transmit antenna 31c undergoes frequency modulation and then is received by the receive antenna 31d, thus resulting in change in output signal waveform of the comparators 32f and 32g. As a result, the resultant rectangular wave is output to the object distance judgment unit 33.

Description of the Object Distance Judgment Unit 33

Next, a description will be given of the object distance judgment unit 33 for accepting output signal waveforms from the comparators 32f and 32g. The object distance judgment unit 33 accepts output signal waveforms from the comparators 32f and 32g and recognizes a phase difference between these output signal waveforms (IF signals). Then, based on the recognized phase difference between output signal waveforms, the object distance judgment unit 33 measures the distance to the detected object (e.g., human body) and judges whether to send an object detection signal (issue an alarm) according to the distance.

Frequency Difference Setting Between Transmitted Microwaves

The present embodiment is characteristic in that the frequency difference is set to a given value in advance between two transmission microwaves that will be transmitted toward the detection area from the transmit antenna 31c. A description will be given below of predetermined operations in relation to frequency difference of the transmission microwaves.

In the MW sensor 3 according to the present embodiment, the frequency difference of two transmission microwaves is set such that the phase difference between the IF signals is approximately 180° when there is an object at the intermediate distance between the maximum detection distance within the target detection area—predetermined area for object detection—and the maximum detection distance (maximum detection distance within the detection area set in the event of the maximum mounting error) in the event of a deviation of the detection area attributable to mounting error of the burglar sensor unit 1 (mounting error of the PIR sensor 4). "In the event of the maximum mounting error" refers to the case in which the maximum mounting error occurs due to internal mechanism (e.g., angle adjustment mechanism) in the burglar sensor unit 1 or the PIR sensor 4 or the maximum mounting error caused by angle error on the wall surface on which the burglar sensor unit 1 is installed. A specific description will be given below of frequency difference setting operation for transmission microwaves.

The detection distance calculation formula for this type of the MW sensor 3 is given by the following formula (1):

$$R = \phi \cdot C / (4 \pi \cdot \Delta f) \quad (1)$$

(R: detection distance, C: speed of light, φ: phase difference between IF signals to be detected, Δf: frequency difference of two microwaves)

The following formula (2) is obtained from formula (1):

$$\Delta f = \phi \cdot C / 4 \pi \cdot R \quad (2)$$

Based on the formula (2), the frequency difference (Δf) of the two transmission microwaves is set in advance such that the phase difference is 180° (π) between IF signals when there is an object at the intermediate distance. That is, the frequency difference of transmission microwaves that results in the phase difference of 180° (π) between IF signals is calculated by substituting π into φ in the formula (2). If we suppose, for example, that the maximum detection distance within the target detection area is 30 m and that the maximum detection distance within the detection area attributable to infrared sensor mounting error is 63.6 m (in the event of the 3° mounting error: refer to Table 1), the intermediate distance between the maximum detection distances is approximated at 47 m or {(30+63.6)/2}. Hence, Δf≈1.6 MHz is found from the formula (2). More specifically, arbitrary frequencies within the 10 GHz band (two frequencies differing in frequency from each other by 1.6 MHz) are set.

In other words, the frequency difference (Δf) of two transmission microwaves is found such that the following holds:

$$Rlim \approx (Rpir + Rpir2)/2 \quad (3)$$

(Rlim: maximum detection distance when φ=π, Rpir: maximum detection distance with no mounting error in the PIR sensor 4, Rpir2: maximum detection distance with mounting error in the PIR sensor 4)

Figure 5:
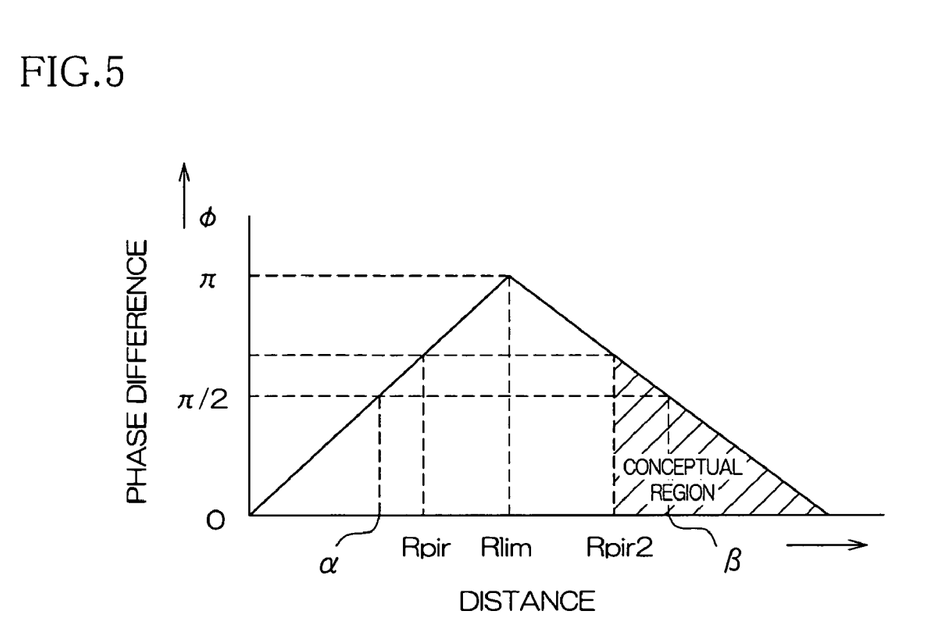
FIG. 5 illustrates the relationship between phase difference between IF signals and distance to the object according to the present embodiment.

FIG. 5 illustrates the relationship between absolute value of phase difference (hereinafter referred simply as "phase difference") between IF signals and distance to the object and shows the case in which the frequency difference (Δf) of two transmission microwaves is determined as discussed above.

As is apparent from the figure, two points are obtained as the distance to the object from the detected phase difference between IF signals, as a result of aliasing occurring at the 180° (π) phase difference point in the line showing the relationship between phase difference between IF signals and distance to the object.

However, when the frequency difference (Δf) of two transmission microwaves is set as in the present embodiment, aliasing occurs in the aforementioned line at the midpoint between the maximum detection distance (Rpir) with no mounting error in the PIR sensor 4 and the maximum detection distance (Rpir2) with mounting error in the PIR sensor 4. Since distances farther than the maximum detection distance (Rpir2) with mounting error in the PIR sensor 4 do not constitute part of the detection area (do not constitute part of the area covered by the PIR sensor 4 even in the event of mounting error in the PIR sensor 4), if IF signals are received with the same phase difference as that derived assuming there is an object within this area, a conclusion can be drawn that the object is located within the range up to the maximum detection distance (Rpir) with no mounting error in the PIR sensor 4. This means that it is possible to arrive at the conclusion that the object is within the original target detection area (30 m or less).

Thus, the present embodiment ensures accurate detection of objects only within the desired detection area even in the event of a mounting error in the PIR sensor 4 while remaining unaffected by "aliasing error"—the drawback to the microwave sensor, thus offering improved reliability to the sensor. More specifically, experiments conducted on the burglar sensor unit 1 according to the present embodiment show that the object detection error was in the ±5 m range. This means that the burglar sensor unit 1 would not mistakenly detect any object farther than a distance of 35 m even in the event of a considerable mounting error.

<Variant>

A variant of the present invention will be described next. The present variant takes into consideration errors in the frequency difference of two microwaves, the phase difference between IF signals and so on.

That is, the frequency difference of two microwaves transmitted by the MW sensor 3 is set slightly lower than the value that results in a phase difference of 180° between IF signals when there is an object at the intermediate distance between the maximum detection distance within the preset target detection area and the maximum detection distance in the event of a deviation of the detection area attributable to mounting error in the burglar sensor unit 1 (mounting error in the PIR sensor 4). In the aforementioned case, for instance, Δf=1.4 MHz rather than Δf=1.6 MHz.

FIG. 6 shows a line representing the relationship between phase difference between IF signals and distance to the object when the frequency difference of two microwaves is set as described above. As is clear from the figure, expansion of the conceptual region allows, even in the event of a certain amount of the error, overlapping of phase difference between IF signals derived from an object existing within the original target detection area (area up to the distance Rpir in the figure) and phase difference derived from an object existing within the conceptual region, thus ensuring detection of objects only within the desired detection area and providing further improved reliability to the sensor.

Other Embodiments

While the aforementioned embodiments and variants have been described assuming that the combined sensor is applied to a burglar system, the present invention is not limited thereto, but may be employed as a combined sensor for other systems.

It should be noted that the MW sensor 3 and the PIR sensor 4 need not be accommodated within the same case 2.

As for the infrared sensor, not only passive infrared sensor (PIR sensor) but also active infrared sensor (AIR sensor) may, in some cases, be used.

Further, while, in the aforementioned embodiments and variants, the angle in the event of the maximum mounting error was determined to be ±3°, the present invention is not limited thereto. As for the above distances, the present invention is similarly not limited thereto.

Other alternative embodiments of the present invention may variously be devised without departing from the spirit or main features of the invention. Therefore, the aforementioned embodiments are intended to be merely illustrative in all respects but not restrictive, the scope of the invention being defined by the appended claims but not bound in any way by the foregoing description of this specification. Further, it is intended that the invention be construed as including all alterations and modifications in so far as they come within the scope of the equivalents of the appended claims.

This application claims the benefit of priority to Japanese Patent Application No.2003-312412 the full disclosure of which is incorporated herein by reference. The documents cited in this specification are in its entirety incorporated herein specifically by reference.

What is claimed is:

1. A combined sensor comprising:
    a microwave sensor that transmits two microwaves having different frequencies, receives, if there is an object in the direction of transmission of the microwaves, reflected waves of respective microwaves from the object and detects the object based on phase difference between IF signals after mixing of the reflected and transmission waves; and
    an infrared sensor that receives infrared radiation from an object in the detection area and detects the object, wherein an alarm is issued if an object is detected by the two sensors, and wherein
    the frequency difference of two microwaves transmitted by the microwave sensor is set such that the phase difference between the IF signals is approximately 180° when there is an object at the intermediate distance between the maximum detection distance within the target detection area or predetermined area for object detection and the maximum detection distance in the event of a deviation of the detection area attributable to mounting error of the infrared sensor.

2. The combined sensor according to claim 1, wherein the frequency difference of two microwaves transmitted by the microwave sensor is set lower than the value that results in a phase difference of 180° between IF signals when there is an object at the intermediate distance between the maximum detection distance within the target detection area or predetermined area for object detection and the maximum detection distance in the event of a deviation of the detection area attributable to mounting error of the infrared sensor.

* * * * *